(12) United States Patent
Doi et al.

(10) Patent No.: US 6,307,561 B1
(45) Date of Patent: Oct. 23, 2001

(54) ANIMATION GENERATING APPARATUS AND METHOD

(75) Inventors: Miwako Doi, Kawasaki; Akira Morishita, Tokyo; Naoko Umeki; Yasunobu Yamauchi, both of Kawasaki; Shunichi Numazaki, Yokohama, all of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/039,381

(22) Filed: Mar. 16, 1998

(30) Foreign Application Priority Data

Mar. 17, 1997 (JP) .................................................. 9-063282

(51) Int. Cl.[7] .................................................. G06T 17/00
(52) U.S. Cl. .................................................. 345/473
(58) Field of Search .................................. 345/473, 474, 345/418, 472

(56) References Cited

U.S. PATENT DOCUMENTS

| 5,548,693 | * | 8/1996 | Shinya ................................... 345/473 |
| 5,583,980 | * | 12/1996 | Anderson .............................. 345/473 |
| 5,867,175 | * | 2/1999 | Katzenberger et al. ............. 345/473 |

OTHER PUBLICATIONS

Lee et al, "Polymorph: Morphing Among Multiple Images", IEEE, pp. 60–65, Feb. 1998.*

* cited by examiner

*Primary Examiner*—Cliff N. Vo
(74) *Attorney, Agent, or Firm*—Oblon, Spivak, McClelland, Maier & Neustadt, P.C.

(57) ABSTRACT

When a path for associating a plurality of object images selected in advance is input, the synthesis ratios of the object images corresponding to each dividing point obtained by equally dividing the path are calculated on the basis of the position of the dividing point, and the object images are synthesized on the basis of the object images for each dividing point, thereby generating a plurality of frame images.

24 Claims, 12 Drawing Sheets

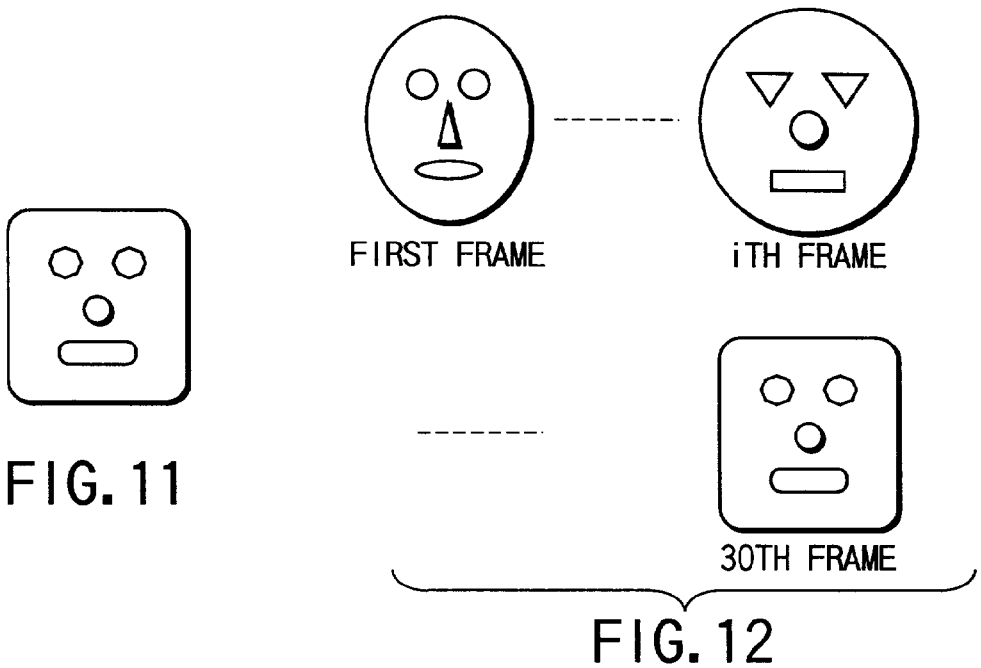
FIG. 11
FIG. 12
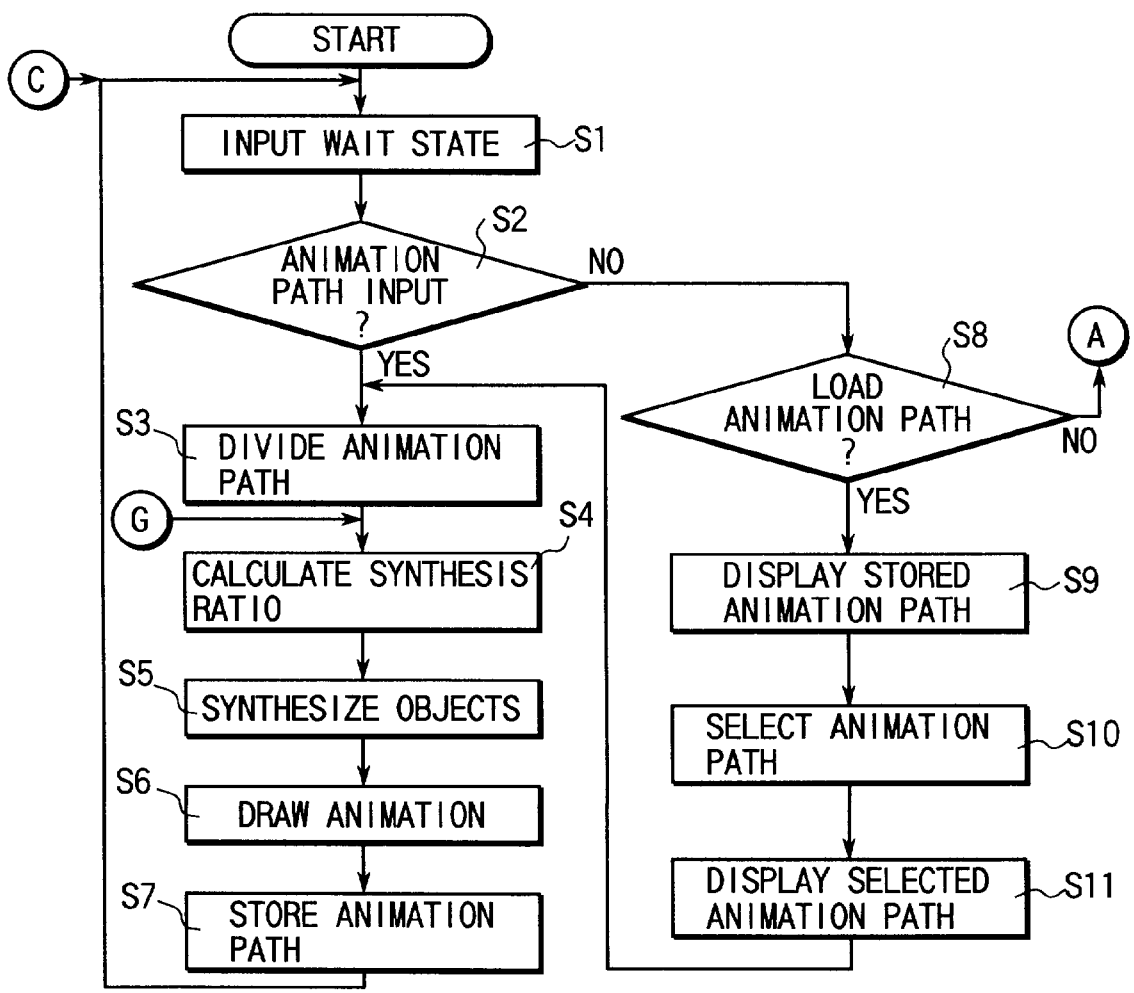
FIG. 13

| ANIMATION PATH IDENTIFICATION NUMBER | CORRESPONDING OBJECT INDENTIFICATION NUMBER |
|---|---|
| xxxx961221_apath_doi | xxxx961213_obj_doi1<br>xxxx950808_obj_doi1<br>xxxx950808_obj_doi3<br>xxxx950808_obj_doi2<br>NULL |
| xxxx970107_apath_doi2 | xxxx961213_obj_doi1<br>xxxx991213_obj_doi2<br>xxxx961213_obj_doi3<br>xxxx950808_obj_doi2<br>NULL |
| ⋮ | ⋮ |
FIG. 15
| ANIMATION PATH IDENTIFICATION NUMBER | ANIMATION PATH |
|---|---|
| xxxx961221_apath_doi1 |  |
| xxxx970107_apath_doi2 |  |
| ⋮ | |
FIG. 16

ANIMATION GENERATING APPARATUS AND METHOD

BACKGROUND OF THE INVENTION

This application is based on Japanese Patent Application No. 9-63282, filed on Mar. 17, 1997, the content of which is cited herein by reference.

The present invention relates to an apparatus for controlling generation/editing of, e.g., a CG animation.

Improvement in processing performance of personal computers (PCs) allows to handle a real-time computer graphic animation (CG animation) on the PCs. Accordingly, the number of CG applications which run on the PCs increases, and general individuals are having more opportunities for generating/enjoying CG contents. Along with the increase in opportunities, various applications for generating a CG animation on a PC have been invented.

A means for generating an animation on the PC is based on a three-dimensional coordinate data set (three-dimensional CG animation) or a bitmap data set (two-dimensional CG animation).

When a CG animation is to be generated on the basis of a bitmap data set, bitmap data sets corresponding to various scenes are prepared, and these bitmap data are switched and displayed, thereby displaying a CG animation. Sometimes, a plurality of bitmap data called sprites are prepared, and these sprites are superposed and displayed to make one scene. In this case, the animation is generated by changing the sprite display position in units of scenes or displaying a plurality of sprites corresponding to each scene while switching them.

Since the two-dimensional CG animation is constituted by bitmap data sets, each scene can be generated by simply drawing a picture. Hence, anyone can generate the two-dimensional CG animation although a long time is required. In addition, since a bitmap image merely need be displayed, the processing amount in reproducing the animation is constant independently of the precision or complexity (contents of the bitmap image) of the display object of each scene.

However, to generate a two-dimensional CG animation having a complex motion intended by the user, each bitmap image must be generated, and this operation requires much time. If only a few bitmap images need be prepared and simply moved as sprites, or switched and displayed, the two-dimensional CG animation can be generated in a relatively short time, as a matter of course, though this results in a considerably simple animation.

Even if an enormous quantity of bitmap image data can be prepared, a large-capacity storage unit is required to store all the bitmap data. Additionally, to efficiently compress these data, dedicated hardware having an encoding function such as objective MPEG is also required.

On the other hand, a means called "warping" capable of deforming one bitmap image as an original image to generate various scenes is available. As shown in FIGS. 1A and 1B, in warping, points called control points are arranged in a matrix on the original image. The positions of control points are changed to deform a bitmap image positioned in an area defined by the control points in accordance with the deformation in the area defined by the control points, thereby generating a new scene.

However, the warping means is a technique of generating a new scene by deforming a mesh-like rectangular area defined by control points after all, so considerable limitations are imposed on a scene to be generated. For example, the movable range of a control point is limited to an area defined by adjacent control points. Therefore, as shown in FIG. 2, only an image area corresponding to the hand of a human figure can hardly be largely moved. In addition, when the moved hand portion overlaps the face portion, the shape of the image area corresponding to the face cannot be kept unchanged.

To avoid this, the original image must be divided into sprites comprising a plurality of parts for the hand, face, and the like. Therefore, one existing bitmap original image to be used must be divided into a plurality of sprites in advance, so cumbersome preprocessing must be performed.

Even when warping processing is to be forcibly performed, although no desired scene can be obtained, an enormous number of control points must be operated one by one to generate a CG animation of, e.g., the articulated motion of a hand. For this purpose, the position of each control point must be moved in consideration of conditions to be stored such as the balance of shape of the hand, so this means is not practical.

A means called morphing as an application of warping can generate an interpolated image between two bitmap images to generate a new image. As shown in FIGS. 3A and 3B, in morphing, control points indicating the positional relationship between two bitmap images must be designated in each of the two original images. In FIG. 3B, control points a1 and b1 which correspond the hand positions in a scene A and a scene B to each other are designated. An internally dividing point m1 is determined on the straight line connecting the control points a1 and b1. In the scene A, the control point a1 is changed to m1. In the scene B, the control point b1 is changed to m1. After this, warping processing is performed. With this processing, the positions of hands in these scenes can be moved to almost the same position. When the two resultant warping scenes are blended at an appropriate ratio, an interpolation scene can be automatically generated.

When an intermediate scene is generated and continuously displayed while gradually moving the internally dividing point m1 along the straight line to the control point b1, a CG animation changing from the scene A to the scene B is obtained.

However, the morphing means is an application of the warping means after all, so the scene which can be generated is limited, like the warping means. For example, even when a scene of arms outstretched and a scene of arms crossing each other are subjected to morphing, no natural animation can be generated because of the limitation on the movable range of control points in the warping means. In addition, control points representing the same position in two images must be set in one-to-one correspondence. For this reason, when a lot of control points are set, a long time is needed only to grasp the correspondence.

Furthermore, to generate a CG animation of another articulated motion, an operation of designating, as a control point, the positional relationship between two prepared bitmap images which are different only in the manner of bending arms must be performed, and a considerably large number of control points must be designated one by one to realize a natural animation. For this reason, the morphing means is not practical.

As described above, to generate an animation by warping or morphing, control points must be arranged on the original image and operated. This operation is complex and inconvenient for a general user who wants to easily generate an animation.

To allow everyone to generate an animation only by an intuitive and simple operation, a means for generating an animation with any motion from one bitmap image is necessary. However, the above-described conventional CG animation generation means based on the bitmap data set cannot meet this requirement.

As described above, the conventional CG animation generating apparatus based on the bitmap data set cannot generate an animation having an arbitrary motion only by an intuitive and simple operation for one original bitmap image or a bitmap image as a sprite constituting the original image.

BRIEF SUMMARY OF THE INVENTION

It is an object of the present invention to provide an animation generating method allowing easy generation of an animation having an arbitrary motion only by an intuitive and simple operation, and an animation generating apparatus using the same.

According to an aspect of the present invention, there is provided an animation generating apparatus comprising:

input means for inputting a path for associating a plurality of object images selected in advance; and generation means for synthesizing the object images associated with each other along the path input by the input means on the basis of a length and direction of the path to generate a plurality of frame images.

With this arrangement, only by performing an intuitive and simple operation of inputting the path, an animation having an arbitrary motion can be easily generated.

According to another aspect of the present invention, there is provided an animation generating apparatus comprising:

input means for inputting a path for associating a plurality of object images selected in advance;

path division means for equally dividing the path input by the input means;

calculation means for calculating synthesis ratios of the object images corresponding to each dividing point obtained by dividing the path by the path division means, on the basis of a position of the dividing point; and generation means for synthesizing the object images on the basis of the synthesis ratios calculated by the calculation means for each dividing point to generate a plurality of frame images. With this arrangement, only by performing an intuitive and simple operation of inputting the path, an animation having an arbitrary motion can be easily generated.

Even on the same object images, the animation to be generated changes depending on the shape of the path drawn on the object images. That is, an animation based on a path can be easily corrected or improved on the basis of the shape of the previous path.

Since complex image synthesis can be easily instructed only by drawing a path with a complex shape, and the animation based on the drawn path can be immediately confirmed, the desired animation can be easily generated.

When the number of divided parts of a path is determined on the basis of time corresponding to a path, which is designated by the user, or the speed of path drawing of the user, the motion of animation can be easily adjusted.

Note that the path need not always be used to generate an animation on the basis of objects which have already been made to correspond to the path. That is, the correspondence between a path and objects is arbitrary. If a global unique identification number is added to the path, the subject of copyright of an individual motion of a certain animation can be easily identified. When the path is made to correspond to different objects, an animation having a different individuality (style) can be obtained.

In an animation generating method of the present invention, when a path for associating a plurality of object images selected in advance is input, the object images associated with each other along the path are synthesized on the basis of a length and direction of the path to generate a plurality of frame images. With this arrangement, only by performing an intuitive and simple operation of inputting the path, an animation having an arbitrary motion can be easily generated.

In an animation generating method of the present invention, when a path for associating a plurality of object images selected in advance is input, synthesis ratios of the object images corresponding to each dividing point obtained by equally dividing the path are calculated on the basis of a position of the dividing point, and the object images are synthesized on the basis of the synthesis ratios for each dividing point to generate a plurality of frame images. With this arrangement, only by performing an intuitive and simple operation of inputting the path, an animation having an arbitrary motion can be easily generated.

Even on the same object images, the animation to be generated changes depending on the shape of the path drawn on the object images. That is, an animation based on a path can be easily corrected or improved on the basis of the shape of the previous path.

Since complex image synthesis can be easily instructed only by drawing a path with a complex shape, and the animation based on the drawn path can be immediately confirmed, the desired animation can be easily generated.

When the number of divided parts of a path is determined on the basis of time corresponding to a path, which is designated by the user, or the speed of path drawing of the user, the motion of animation can be easily adjusted.

Note that the path need not always be used to generate an animation on the basis of objects which have already been made to correspond to the path. That is, the correspondence between a path and objects is arbitrary. If a global unique identification number is added to the path, the subject of copyright of an individual motion of a certain animation can be easily identified. When the path is made to correspond to different objects, an animation having a different individuality (style) can be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 11 is a view showing a frame image generated by synthesizing object images;

FIG. 12 is a view showing frame images generated along the path;

FIG. 13 is a flow chart for explaining the operation of the animation generating apparatus shown in FIG. 4;

FIG. 15 is a view showing an example of path information stored in an animation path storage means, in which a path identification number and an object identification number are stored in correspondence with each other;

FIG. 16 is a view showing an example of path information stored in the animation path storage means, in which a path identification number and path image information are stored in correspondence with each other;

DETAILED DESCRIPTION OF THE INVENTION

The embodiments of the present invention will be described below with reference to the accompanying drawing.

First Embodiment

Figures 1A, 1B:
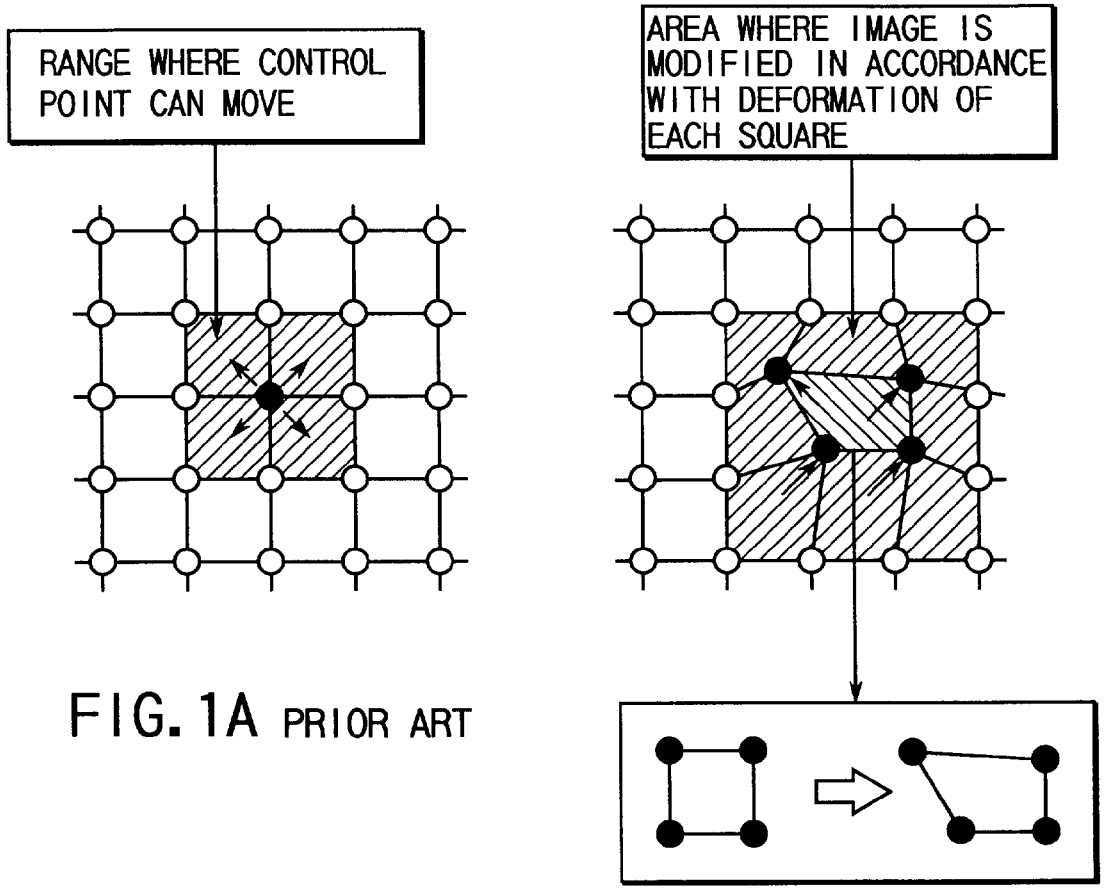
FIGS. 1A and 1B are views for explaining animation generation by a conventional animation generating apparatus using warping.
Figure 2:
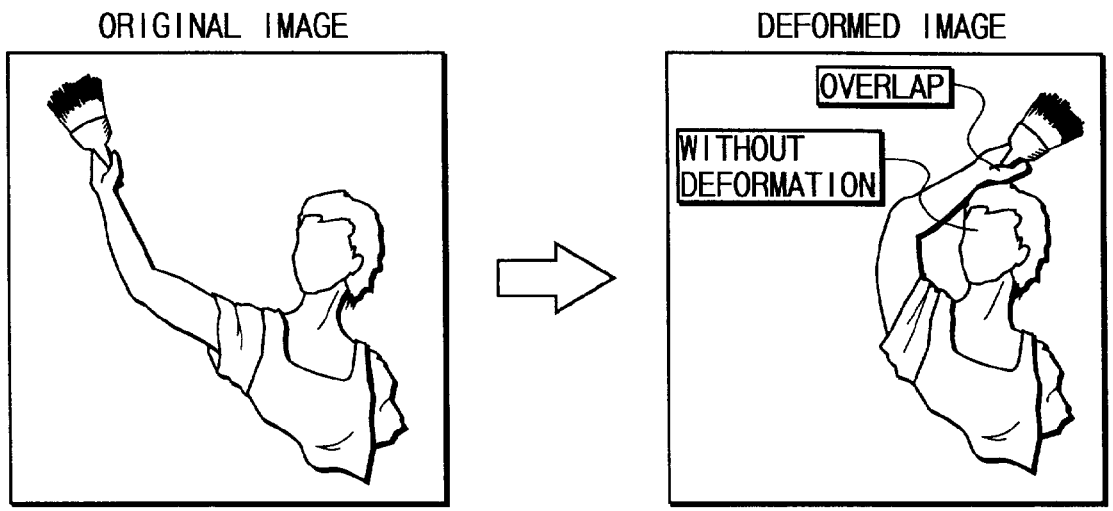
FIG. 2 is a view showing an example of the animation generated by warping.
Figure 3A:
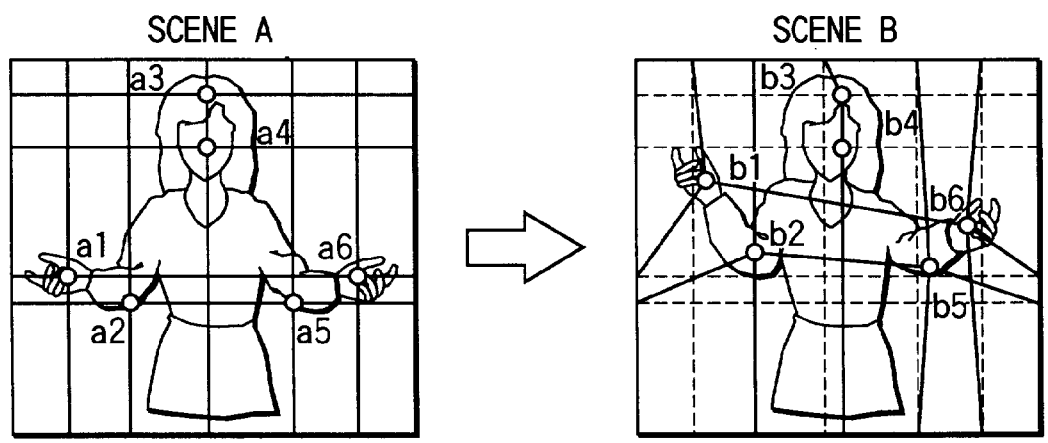
FIGS. 3A and 3B are views for explaining animation generation by the conventional animation generating apparatus using morphing.
Figure 3B:
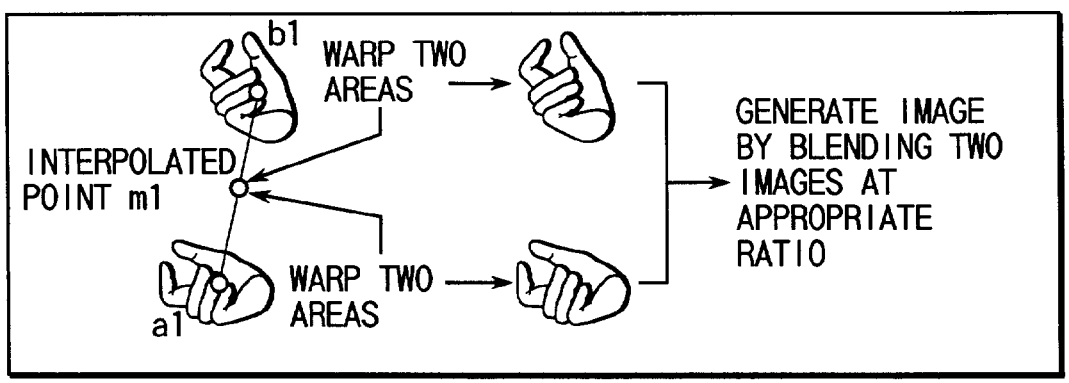
Figure 4:
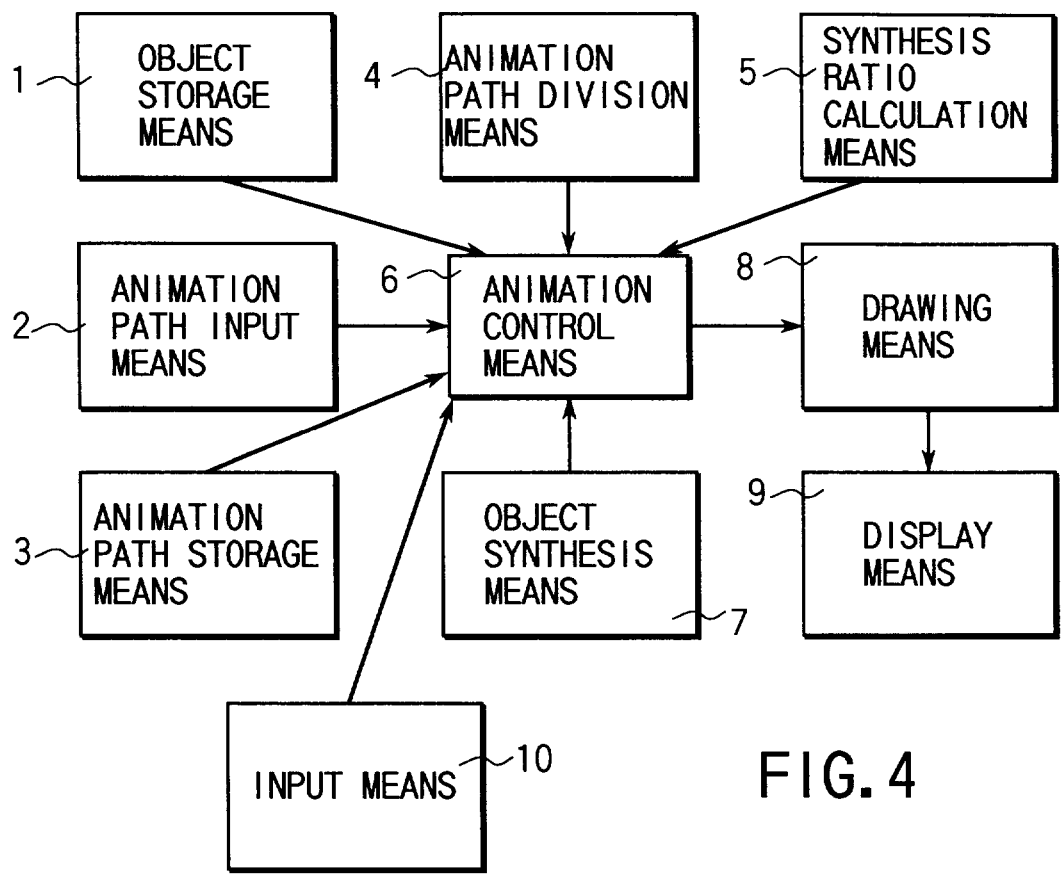
FIG. 4 is a block diagram schematically showing the arrangement of an animation generating apparatus according to the first embodiment of the present invention.

FIG. 4 is a block diagram schematically showing the arrangement of an animation generating apparatus according to the first embodiment. As shown in FIG. 4, the animation generating apparatus comprises an object storage means 1 for storing image data as an original image (to be referred to as an object image or simply as an object hereinafter), an animation path input means 2 for inputting a path for associating, of objects stored in the object storage means 1, a plurality of objects selected by the user with each other, an animation path storage means 3 for storing the path input by the animation path input means 2, an animation path division means 4 for dividing the path stored in the animation path storage means 3, a synthesis ratio calculation means 5 for calculating the synthesis ratio of object images corresponding to equally dividing points obtained by equally dividing the path, on the basis of the positions of the equally dividing points, an object synthesis means 7 for synthesizing the object images on the basis of the calculated synthesis ratio to generate a frame image corresponding to the dividing points, a drawing means 8 for drawing the generated frame image, a display means 9 for displaying the result drawn by the drawing means 8 or object images read out from the object storage means 1, an input means 10 constituted by various input devices such as a scanner for inputting, e.g., an object image, a mouse, and a keyboard for, e.g., selecting a desired object image from object images stored in the object storage means 1, and an animation control means 6 for performing control to cooperate the above means to generate a series of animations.

The object storage means 1 may store a set of a plurality of original images. For example, a set of four original images may be stored, as shown in FIG. 5.

When the user operates, e.g., the input means 10 to select a desired object image or a set of object images from the object storage means 1, the selected object image is displayed on the display means 9.

Figure 5:
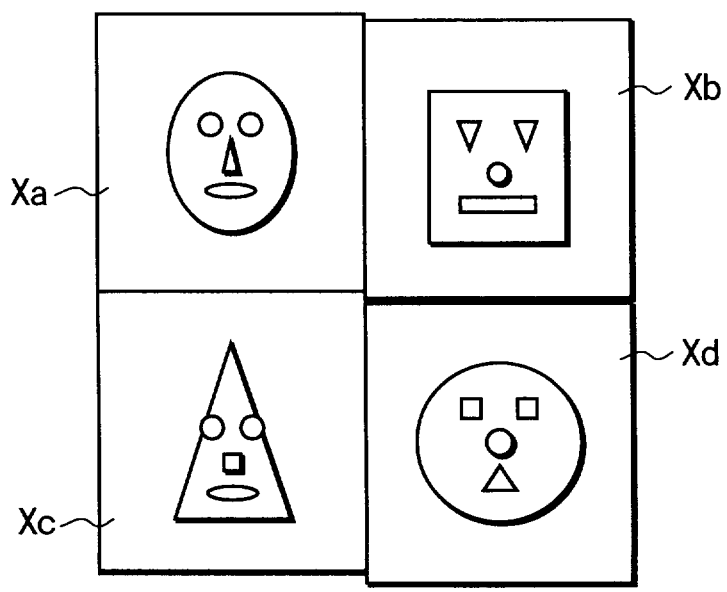
FIG. 5 is a view showing an example of object display.

FIG. 5 shows an example of object images displayed on the display means 9. As shown in FIG. 5, four object images Xa, Xb, Xc, and Xd of faces with different expressions are displayed in a 2×2 matrix.

Figure 6:
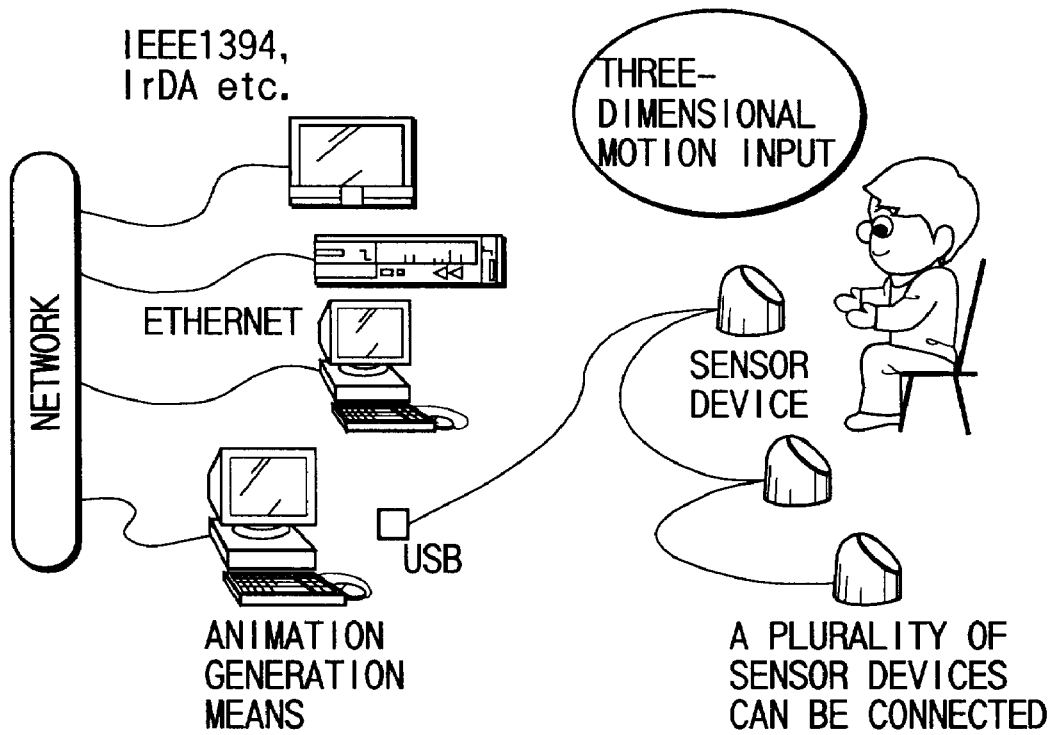
FIG. 6 is a view for explaining input of a desired path using, e.g., a sensor device as an animation path input means 2.

In this state, the user inputs a desired path through the animation path input means 2. The animation path input means 2 may input a path for associating objects displayed as in FIG. 5 using, e.g., a mouse. Alternatively, a sensor device for detecting the movement of the barycenter of the user's hand and performing image processing, as described in Japanese Patent Application No. 8-275949, may be used. More specifically, when the user waves with his/her hand in front of the sensor device, the locus of the barycenter of the hand is input as a path (FIG. 6).

Figure 7:
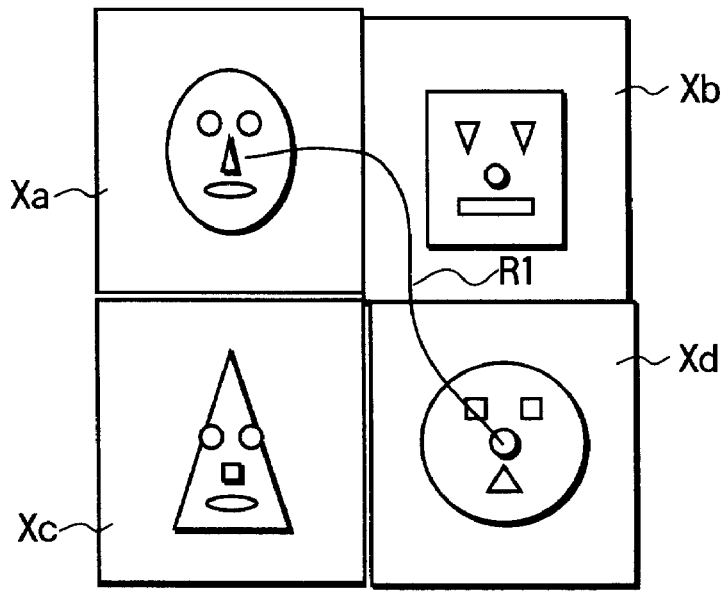
FIG. 7 is a view showing a path input on four object images displayed in the form shown in FIG. 5.

FIG. 7 shows a path input on the four object images displayed as shown in FIG. 5. The locus of a path R1 drawn by the user on the four object images displayed on the display means 9 through the animation path input means 2 is displayed by the display means 9, as shown in FIG. 7.

The animation generating apparatus of the present invention synthesizes the four object images shown in FIG. 7 on the basis of a path input in this manner to generate a plurality of image frames, thereby generating an animation.

Figure 8:
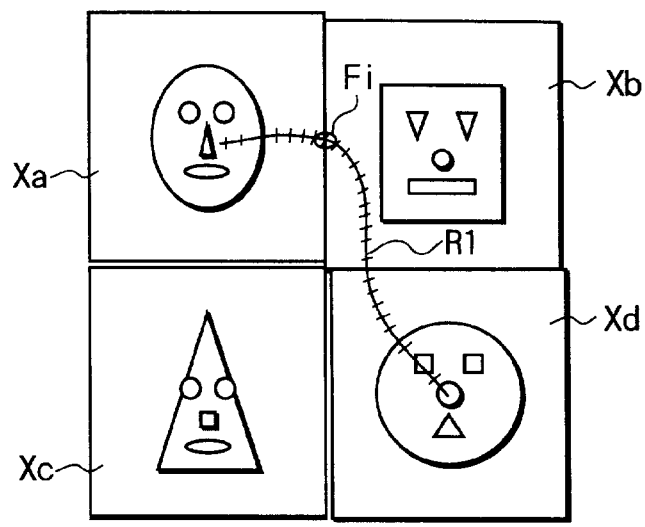
FIG. 8 is a view showing a state wherein the path input by an animation path division means is equally divided.

The path R1 input through the animation path input means 2 is equally divided by the animation path division means 4, as shown in FIG. 8.

When it is defined in advance that a path input through the animation path input means 2 corresponds to, e.g., one second, the path R1 is, e.g., divided into 30 parts such that the path corresponds to a 1-second animation. This is because, in NTSC as a standard color TV broadcasting scheme, an image is reproduced at a rate of 30 frames per second. If it is defined in advance that a path corresponds to two seconds, the path is divided into 2 (seconds)×30 (frames/sec)=60 parts.

The time corresponding to a path input by the user may be set by the user (for example, the default value is set as one second, and a window for asking the user about a change in this value may be displayed on the display means 9).

Alternatively, the speed of inputting a path or time until drawing of a path is complete may be detected, and the time corresponding to a path (the number of divided parts of the path) may be determined on the basis of the detected speed or time.

Normally, the dividing points of the path Ri as shown in FIG. 8 are not displayed on the display means 9. However, when the user inputs a predetermined instruction (e.g., an animation path editing instruction), the dividing points may be displayed as shown in FIG. 8 such that the position of each dividing point can be edited.

Next, the synthesis ratio calculation means 5 calculates the synthesis ratio of the object images for the dividing points obtained by equally dividing the path R1 into, e.g., 30 parts. For the descriptive convenience, an explanation will be made about an ith point obtained by equally dividing the path R1 into 30 parts, i.e., a dividing point Fi shown in FIG. 8 with reference to FIGS. 9 and 10.

The dividing point Fi means a point for generating an ith frame.

Figure 9:
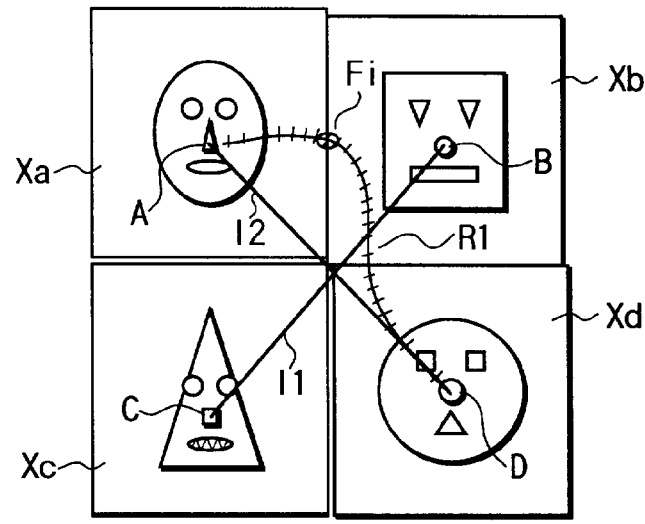
FIG. 9 is a view for explaining a method of calculating the object image synthesis ratio by a synthesis ratio calculation means.

1) Central points A, B, C, and D of the four object images are diagonally connected. More specifically, the central point A of the object image Xa and the central point D of the object image Xd are connected to obtain a diagonal line *liter*2, and the central point B of the object image Xb and the central point C of the object image Xc are connected to obtain a diagonal line *liter*1 (FIG. 9).

Figure 10:
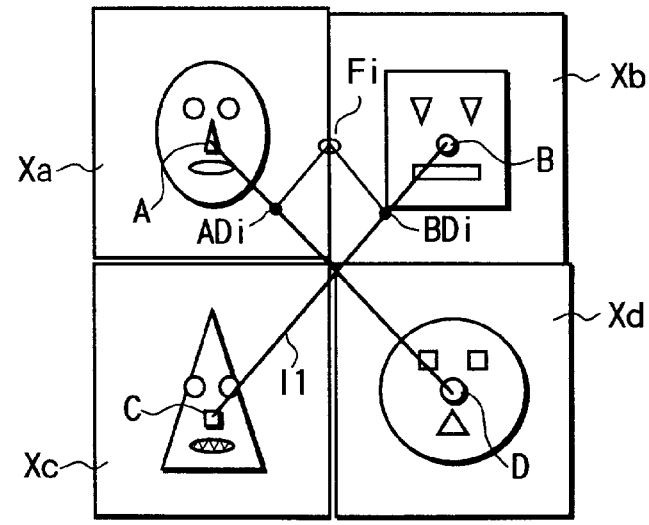
FIG. 10 is a view for explaining the method of calculating the object image synthesis ratio by the synthesis ratio calculation means.

2) Perpendiculars from the dividing point Fi to the diagonal lines *liter*1 and *liter*2 are drawn, and let BCi and ADi be the feet of perpendiculars (FIG. 10).

3) The synthesis ratio of the object images Xa through Xd at the dividing point Fi is calculated. The synthesis ratio of the object image Xa corresponds to the ratio of length between the central point D of the object image Xd and the foot ADi of perpendicular from the dividing point Fi to the diagonal line *liter*2 (ADiD) to the diagonal line length. The synthesis ratio of the object image Xb corresponds to the ratio of length between the central point C of the object image Xc and the foot BCi of perpendicular from the dividing point Fi to the diagonal line *liter*1 (BCiC) to the diagonal line length. The synthesis ratio of the object image Xc corresponds to the ratio of length between the central point B of the object image Xb and the foot BCi of perpendicular from the. dividing point Fi to the diagonal line *liter*1 (BBCi) to the diagonal line length. The synthesis ratio of the object image Xd corresponds to the ratio of length between the central point A of the object image Xa and the foot ADi of perpendicular from the dividing point Fi to the diagonal line *liter*2 (AADi) to the diagonal line length.

The synthesis ratio is obtained by calculating the ratio of each length to the whole diagonal line length (i.e., the sum of lengths of the diagonal lines *liter*1 and *liter*2). The resultant value is further multiplied by ½ such that the whole becomes "1".

A synthesis ratio Mai of the object image Xa at the dividing point Fi is

Mai=length of ADiD/(length of AD=2).

A synthesis ratio Mbi of the object image Xb at the dividing point Fi is

Mbi=length of BCiC/(length of BC=2).

A synthesis ratio Mci of the object image Xc at the dividing point Fi is

Mci=length of BBCi/(length of BC=2).

A synthesis ratio Mdi of the object image Xd at the dividing point Fi is

Mdi=length of AADi/(length of AD=2).

This calculation is performed for all dividing points to obtain the synthesis ratio of each object image at each dividing point.

Next, the object synthesis means 7 synthesizes the object images Xa through Xd in accordance with the resultant synthesis ratios of the object images Xa through Xd at each dividing point to generate a frame image corresponding to each dividing point.

FIG. 11 shows the synthesis result based on the synthesis ratios Ma through Md of the object images Xa through Xd at the dividing point Fi on a path R as shown in FIG. 9.

FIG. 12 shows the object image synthesis results based on the synthesis ratios calculated in the above-described manner at all dividing points on the path R as shown in FIG. 9. More specifically, for the first frame, the object image Xa is directly used without being deformed because the start point of the path R corresponds to the central point A of the object image Xa, as is apparent from FIG. 9.

For the 30th frame as well, the object image Xd is directly used without being deformed because the terminal point of the path R corresponds to the central point D of the object image Xd.

An ith frame (e.g., i=2 through 29) between the first frame and the 30th frame corresponds to a synthesized image at the dividing point Fi.

The frame images generated upon synthesis are drawn by the drawing means 8 and displayed on the display means 9 as an animation.

Figure 14:
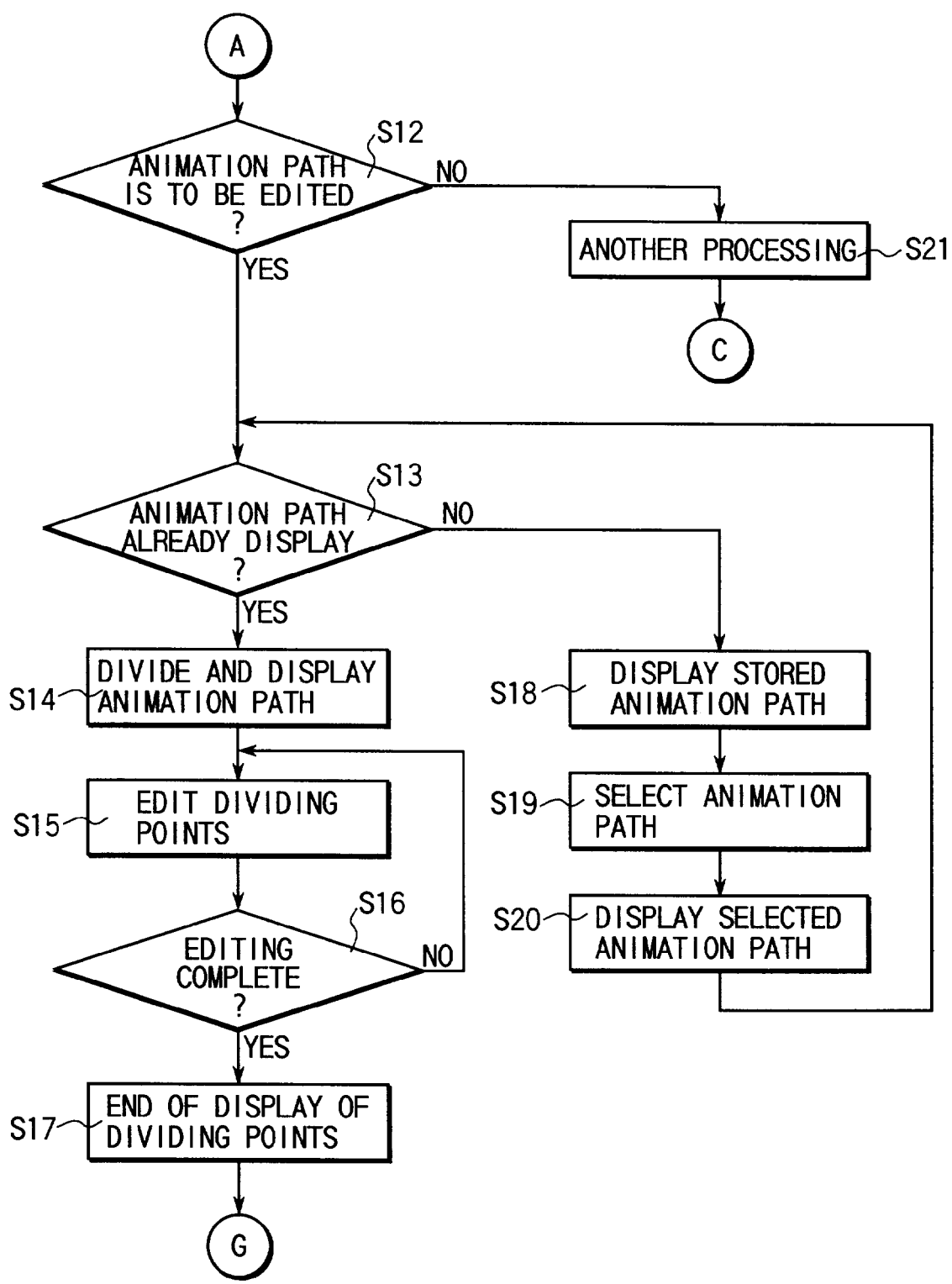
FIG. 14 is a flow chart for explaining the operation of the animation generating apparatus shown in FIG. 4.

The operation of the animation generating apparatus shown in FIG. 4 will be described next with reference to FIGS. 13 and 14.

When the animation generating apparatus is started, and object images selected by the user are read out from the object storage means 1 and displayed on the display means 9, processing waits for an input from the user (step S1). If the user instructs to input a path through a user interface displayed on the display means 9, the processing switches to the function of the animation path input means 2 (step S2). The input path is equally divided into, e.g., 30 parts by the animation path division means 4, as described above (step S3). After this, as described above, the synthesis ratio calculation means 5 calculates the synthesis ratio of each object image (step S4). The object images are synthesized on the basis of the synthesis ratios to generate an frame image (step S5). The frame images are drawn by the drawing means 8, and if an instruction from the user is input, the frame images are displayed on the display means 9 as an animation (step S6). The path input by the user is stored in the animation path storage means 3 (step S7).

The path information in the animation path storage means 3 will be described below.

FIG. 15 shows an example of stored path information. A path input from the animation path input means 2 has an identification number and is stored in correspondence with the identification number of an object corresponding to the path. A changeable number of (identification numbers) of objects can be stored in correspondence with (the identification number of) a path. In FIG. 15, "NULL" means that no data follow.

The structure of a path identification number will be described. In "xxxx970107_apath_doi2", shown in FIG. 15, "xxxx" indicates the manufacturing number of a machine used for path generation; "970107", the date of path generation; "apath", an identifier representing animation path data; "doi", the ID number of the user who has generated the path; and "2", a value representing the second data of the user at the date (this value is automatically incremented). An object identification number has almost the same structure except that "apath" is replaced with an identifier "obj" representing object data.

The path and object identification numbers preferably have such global unique structures.

The animation path storage means 3 also stores path image information input by the user in correspondence with each path identification number, as shown in FIG. 16. This is not limited to path image information, and information of vector sequence (length, direction, and drawing speed of the path) for characterizing each path may be stored.

Figures 17, 18:
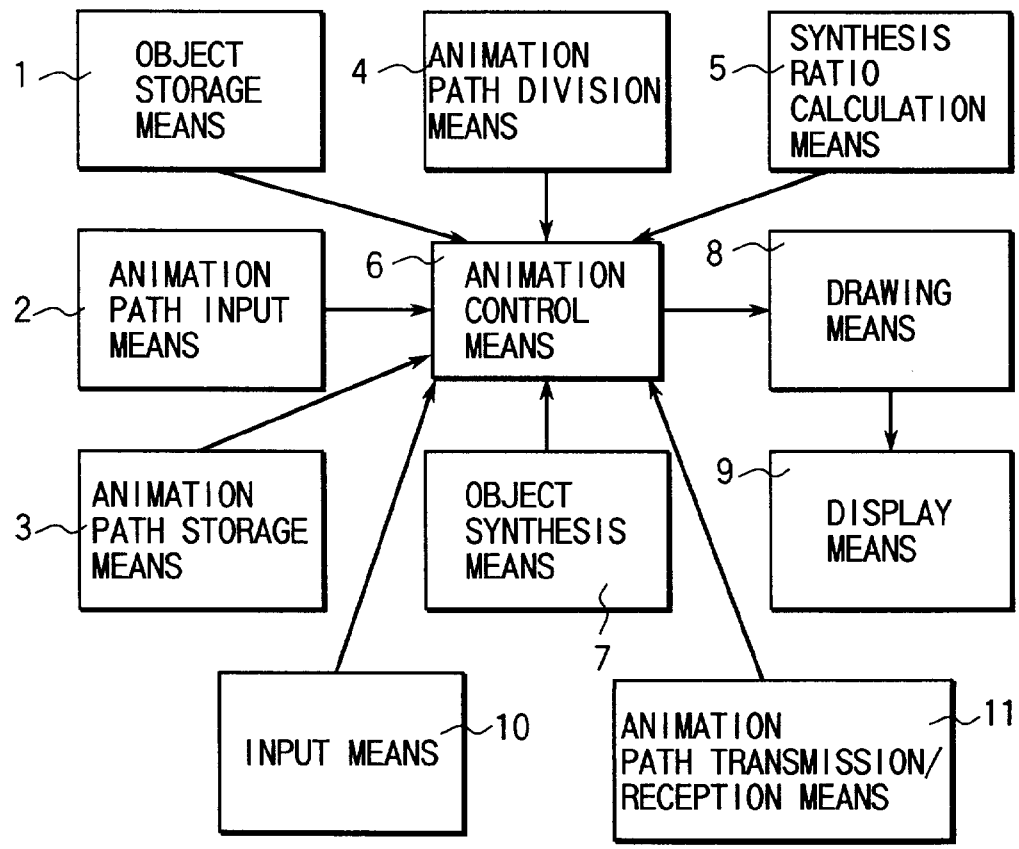
FIG. 17 is a view showing an example of an object identification number and corresponding image information stored in an object storage means.
FIG. 18 is a block diagram schematically showing the arrangement of an animation generating apparatus according to the second embodiment of the present invention.

The object storage means 1 stores each object image in correspondence with an identification number having the above-described structure, as shown in FIG. 17.

Referring back to FIG. 13, in the input wait state in step S1, when the user instructs to load an animation path (step S8), the list of animation paths already stored in the animation path storage means 3 is displayed on the display means 9 (step S9). When a desired path is selected by the user through the input means 10 (step S10), the selected path is displayed (step S11). The flow advances to step S3 to divide the selected path, and the above-described processing is performed.

In the input wait state in step S1, when the user instructs to edit an animation path (step S12 in FIG. 14), and the path has already been displayed, the path is divided and displayed (steps S13 and S14), as shown in FIG. 8. After this, the user can, e.g., change the position of each dividing point (steps S15 through S17). For the changed dividing points as well, synthesis ratios are calculated as described above (steps S4 through S7).

If it is determined in step S13 that the path has not been displayed yet, the flow advances to step S18 to display the path corresponding to the object images which are currently displayed or all paths including the corresponding path, which are stored in the animation path storage means 3 (step S18). A path selected by the user is read out from the animation path storage means 3 and displayed (steps S18 and S19), and the flow returns to step S13.

As described above, according to the first embodiment, when a path for associating a plurality of objects selected in advance is input, this path is equally divided. The synthesis ratio of each object image corresponding to each dividing point is calculated on the basis of the position of the dividing point. The object images are synthesized on the basis of the calculated synthesis ratio of each object image at each dividing point to generate a frame image corresponding to each dividing point. With this arrangement, only by performing an intuitive and simple operation of inputting a path, an animation having an arbitrary motion can be easily generated.

Even on the same object images, the animation to be generated changes depending on the shape of the path drawn on the object images. That is, an animation based on a path can be easily corrected or improved on the basis of the shape of the previous path.

Since complex image synthesis can be easily instructed only by drawing a path with a complex shape, and the animation based on the drawn path can be immediately confirmed, the desired animation can be easily generated.

When the number of divided parts of a path is determined on the basis of time corresponding to a path, which is designated by the user, or the speed of path drawing of the user, the motion of animation can be easily adjusted.

Note that the path need not always be used to generate an animation on the basis of objects which have already been made to correspond to the path. That is, the correspondence between a path and objects is arbitrary. If a global unique identification number is added to the path, the subject of copyright of an individual motion of a certain animation can be easily identified. When the path is made to correspond to different objects, an animation having a different individuality (style) can be obtained.

Second Embodiment

FIG. 18 schematically shows the arrangement of an animation generating apparatus according to the second embodiment. The same reference numerals as in FIG. 4 denote the same parts in FIG. 18, and a detailed description thereof will be omitted. In the second embodiment, an animation path transmission/reception means 11 is added.

The animation path transmission/reception means 11 sets a predetermined communication line to transmit a path stored in an animation path storage means 3 to a partner animation generating apparatus or receive the transmitted path through the set communication line.

Figure 19:
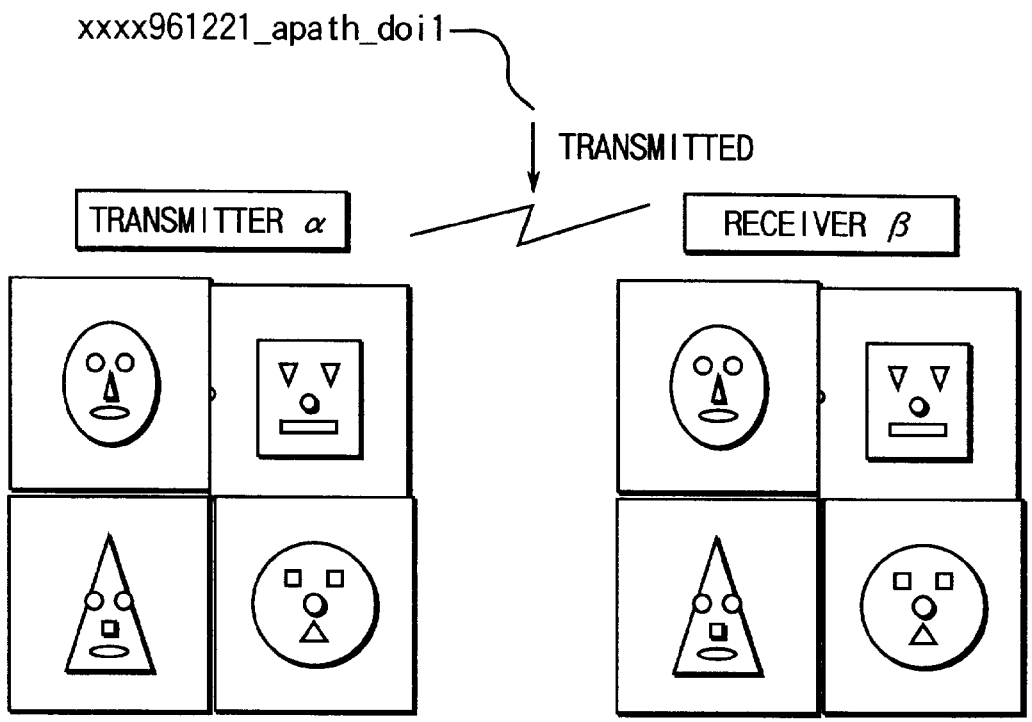
FIG. 19 is a view for explaining path transmission from a path transmitter side to a receiver side where the same objects are present.

As shown in FIG. 19, assume that a path-transmission-side animation generating apparatus a and a path-reception-side animation generating apparatus β have identical object images, e.g., object storage means 1 of the two animation generating apparatuses store object images having identical identification numbers. When the reception-side animation generating apparatus β sends a path transmission request to the partner together with the object identification numbers, the animation generating apparatus α searches the animation path storage means 3 for a corresponding path identification number and transmits the path information to the animation generating apparatus β.

Figure 20:
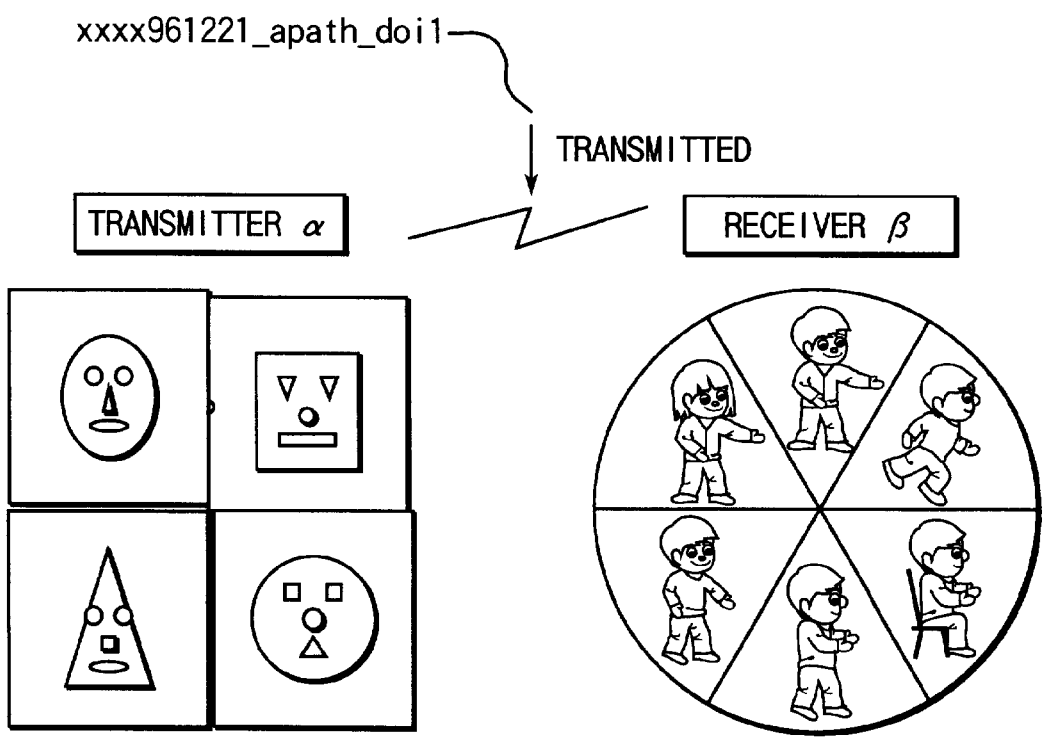
FIG. 20 is view for explaining path transmission from the path transmitter side to a receiver side where different objects are present.

As shown in FIG. 20, the path-transmission-side animation generating apparatus a can transmit desired path information (including path image information or information of vector sequence for characterizing the path) to the path-reception-side animation generating apparatus β such that the animation generating apparatus β can make the received path information correspond to objects different from those corresponding to the path information in the animation generating apparatus α and generate an animation. At this time, the objects corresponding to the path received by the animation generating apparatus β may merely have an arrangement different from those corresponding to the path information in the animation generating apparatus α, or the objects themselves may be different and have a different arrangement.

Transmission/reception of objects corresponding to the path information or arbitrary objects may be performed between the two animation generating apparatuses simultaneously with transmission/reception of the path.

Figure 21:
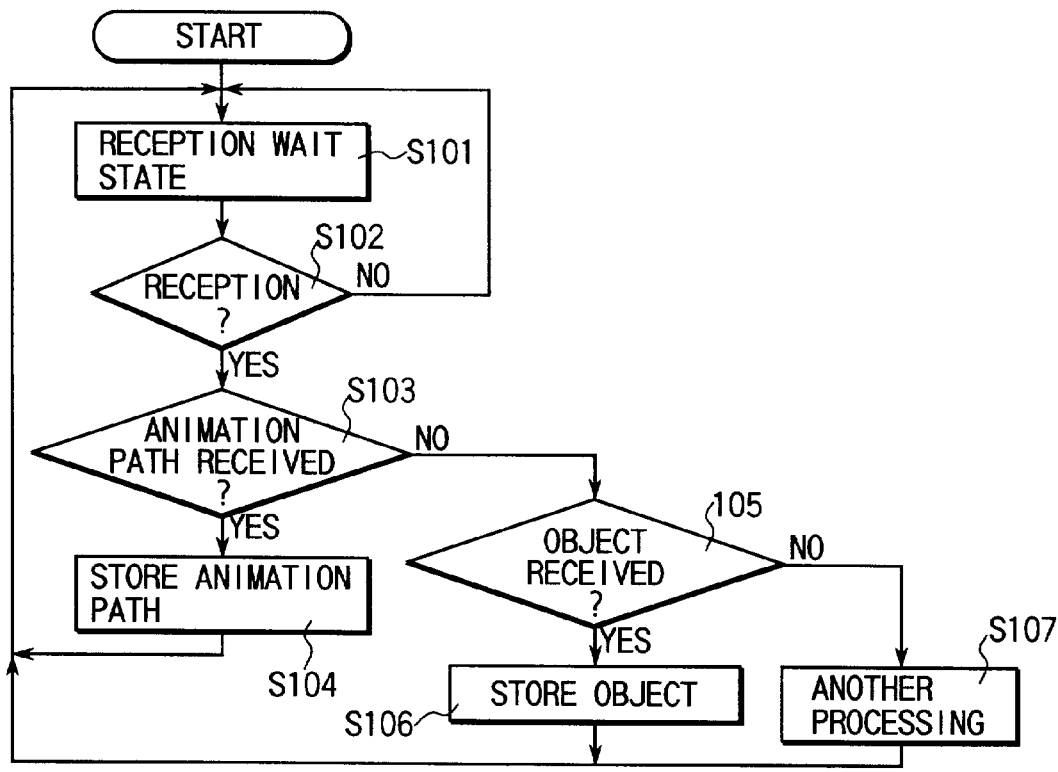
FIG. 21 is a flow chart for explaining, of operations of the animation generating apparatus shown in FIG. 18, particularly an operation of transmitting/receiving a path or an object through an animation transmission/reception means.

The operation of the animation generating apparatus shown in FIG. 18 and, more particularly, the operation of transmitting/receiving a path or object through the animation path transmission/reception means 11 will be described below on the basis of FIG. 21.

The animation path transmission/reception means 11 sends a path transmission request message to, e.g., the partner animation generating apparatus through a predetermined communication line and then waits for reception (step S101). In this state, when path information transmitted from the partner animation generating apparatus is received (steps S102 and S103), the received path information is stored in the animation path storage means 3, as shown in FIGS. 15 and 16 (step S104). If no object identification numbers corresponding to the received path are present, "NULL" is described in the column of "corresponding object identification number" in FIG. 15.

When objects (image information and identification numbers of the objects) are received in step S101 (steps S102, S103, and S105), the received object image information and identification numbers are stored in the object storage means 1, as shown in FIG. 17.

As described above, according to the second embodiment, path transmission/reception is enabled through the animation path transmission/reception means 11. With this arrangement, when the reception-side animation generating apparatus and the transmission-side animation generating apparatus have identical objects, the reception-side animation generating apparatus can also make the same animation as that in the transmission-side animation generating apparatus while making the objects correspond to a path, so the transfer amount can be largely reduced as compared to transfer of the generated animation itself.

In addition, by making the transferred path correspond to different objects, a different animation can be obtained. Therefore, a large quantity of information can be transferred by transferring a very small quantity of information of the path.

Third Embodiment

Figure 22:
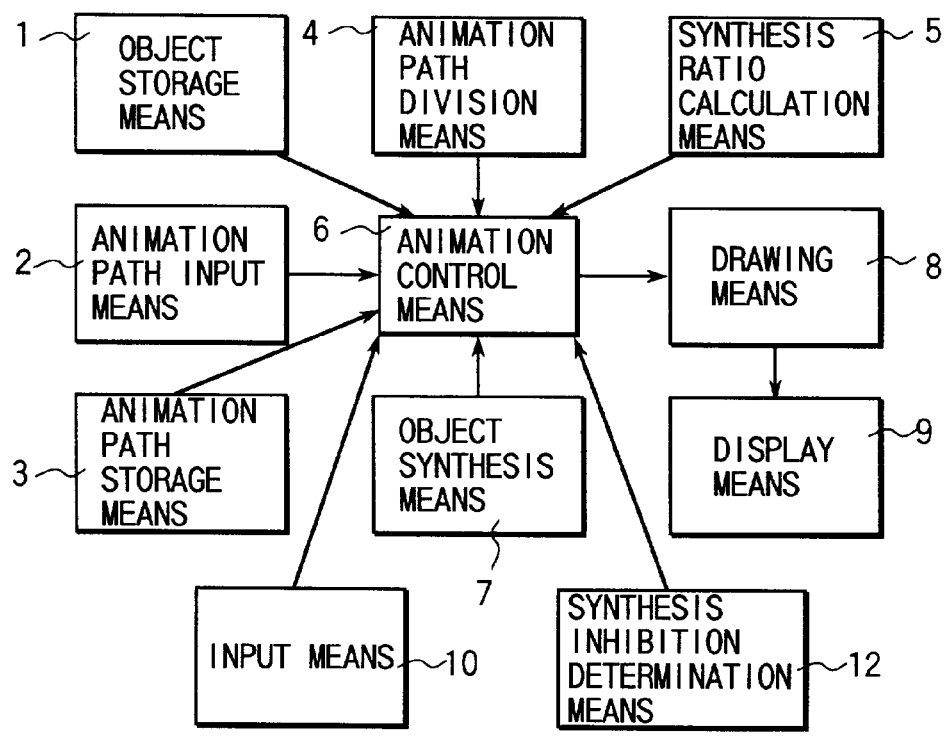
FIG. 22 is a block diagram schematically showing the arrangement of an animation generating apparatus according to the third embodiment of the present invention.

FIG. 22 schematically shows the arrangement of an animation generating apparatus according to the third embodiment of the present invention. The same reference numerals as in FIG. 4 denote the same parts in FIG. 22, and a detailed description thereof will be omitted. In the third embodiment, a synthesis inhibition determination means 12 is added.

Figure 23:
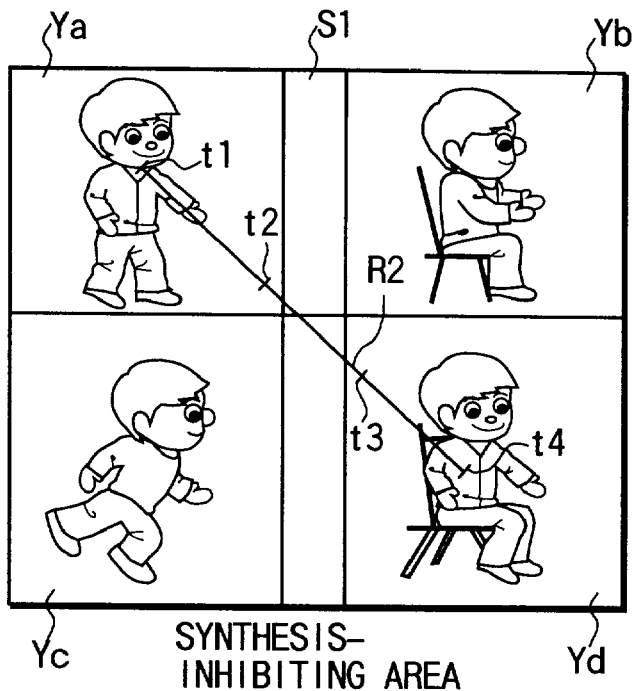
FIG. 23 is a view showing an example of a synthesis-inhibiting area set in an object image.

An object image sometimes has a designated area (synthesis-inhibiting area) which cannot be synthesized with another object image (FIG. 23).

The synthesis inhibition determination means 12 determines whether a path drawn on object images by the user crosses this synthesis-inhibiting area. If it is determined that the path crosses the synthesis-inhibiting area, the object images are synthesized by the object synthesis means 7 excluding the synthesis-inhibiting area. More specifically, frame images at the dividing points of the path crossing the synthesis-inhibiting area are not generated.

For, e.g., an animation expressing a motion of crossing the right and left human arms, the cross portion of the right and left arms looks unnatural unless one of the right and left arms is drawn on the other. The animation generating apparatus of the present invention synthesizes an object with the right arm and an object with the left arm to generate an animation and is likely to generate a frame image in which the right and left arms are synthesized. To prevent this, a synthesis-inhibiting area must be defined.

A method of synthesizing objects along a path crossing the synthesis-inhibiting area in the object images will be described next with reference to FIGS. 23 and 24.

Assume that four object images Ya through Yd are arranged in a 2×2 matrix. For the descriptive convenience, a band-shaped synthesis-inhibiting area S1 is set along the boundary between the object images Ya and Yb and the boundary between the object images Yc and Yd. When the user draws an almost diagonal path R2 from the center of the object image Ya toward the center of the object image Yd, no frame images are generated at dividing points of the path R2 at a portion crossing the synthesis-inhibiting area S1. More specifically, after a frame image corresponding to a dividing point t2 immediately before the synthesis-inhibiting area S1 is synthesized, a frame image corresponding to a dividing point t3 immediately after the synthesis-inhibiting area S1 is synthesized next. No frame images are generated at dividing points between the dividing points t2 and t3.

Figure 24:
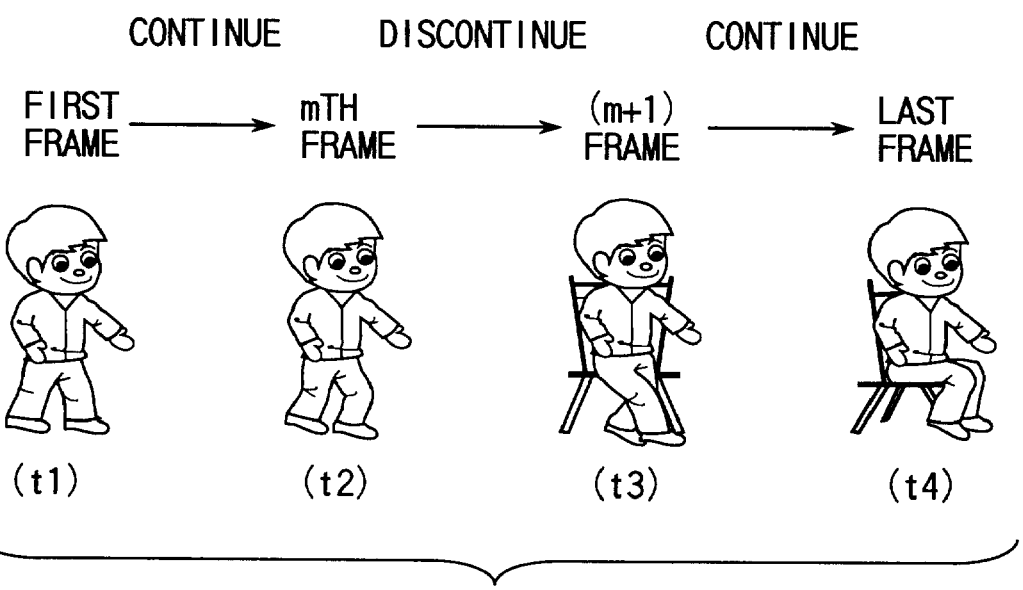
FIG. 24 is a view showing a series of frame images generated when the path drawn in the object image passes through the synthesis-inhibiting area.

FIG. 24 shows object image synthesis results at a dividing point t1 near the start point of the path R2, at the dividing point t2 immediately before the synthesis-inhibiting area S1, at the dividing point t3 immediately after the synthesis-inhibiting area S1, and at a dividing point t4 near the terminal point of the path R2.

Referring to FIG. 24, the first and last frame images generated upon synthesizing the object images at the dividing points t1 and t4 are almost the same as the object images Ya and Yd, respectively, because of the positions of the dividing points t1 and t4, as is apparent.

An mth frame image generated upon synthesizing the object images at the dividing point t2 is synthesized on the basis of synthesis ratios calculated by a synthesis ratio calculation means 5. Image synthesis at dividing points on the synthesis-inhibiting area S1 is skipped. Next, the object images are synthesized on the basis of synthesis ratios at the dividing point t3 to generate an (m+1)th frame image. After this, synthesized images at dividing points on the path R2 are sequentially generated toward the terminal point.

As a result, generation of unnatural frame images as described above can be avoided by appropriately setting the synthesis-inhibiting area in the object images although discontinuity is generated between the mth frame image and the (m+1)th frame image.

The method described in each of the first through third embodiments can be stored in a recording medium such as a floppy disk, a hard disk, a CD-ROM, or a semiconductor memory as a program which can be executed by a computer, and distributed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An animation generating apparatus comprising:
   an input section configured to input a path for linking a plurality of object images selected in advance, the input path having a plurality of dividing points;
   an obtaining section configured to obtain synthesis ratios representing a correlation between the object images and the plurality of dividing points; and
   a generation section configured to synthesize the object images linked by the input path based on the synthesis ratios to generate a plurality of frame images being used for generating rendering data of the generated plurality of frame images.

2. An animation generating apparatus comprising:

an input section configured to input a path for linking a plurality of object images selected in advance;

a path division section configured to equally divide the input path;

a calculation section configured to calculate synthesis ratios of the object images corresponding to each dividing point obtained by the divided path based on a position of the dividing point; and a generation section configured to synthesize the object images based on the calculated synthesis ratios for each dividing point to generate a plurality of frame images being used for generating rendering data of the generated plurality of frame images.

3. An apparatus according to claim 2, wherein the number of divided points of the input path is determined based on a predetermined time corresponding to one path.

4. An apparatus according to claim 2, wherein the number of divided points of the input path input is determined based on a speed of drawing the path.

5. An apparatus according to claim 2, further comprising a section configured to transmit and receive the path through a communication network.

6. An apparatus according to claim 1, wherein the input path links a plurality of other object images with each other and synthesizes the plurality of other object images based on the length and direction of the path to generate the plurality of frame images being used for generating rendering data of the generated plurality of frame images.

7. An apparatus according to claim 2, wherein the input path links a plurality of other object images with each other and synthesizes the plurality of other object images based on the length and direction of the path to generate the plurality of frame images being used for generating rendering data of the generated plurality of frame images.

8. An apparatus according to claim 1, wherein when the input path links predetermined synthesis-inhibiting areas of the plurality of object images, the object images are synthesized excluding the path at a portion contained in said synthesis-inhibiting areas to generate the plurality of frame images.

9. An apparatus according to claim 2, wherein when the input path links predetermined synthesis-inhibiting areas of the plurality of object images, the object images are synthesized excluding the path at a portion contained in said synthesis-inhibiting areas to generate the plurality of frame images.

10. An apparatus according to claim 1, wherein the path and corresponding objects have global unique identifiers.

11. An apparatus according to claim 2, wherein the path and corresponding objects have global unique identifiers.

12. An animation generating method comprising:

inputting a path for linking a plurality of object images selected in advance, the input path having a plurality of dividing points;

obtaining synthesis ratios representing a correlation between the object images and the plurality of dividing points; and synthesizing the object images linked by the input path based on the synthesis ratios to generate a plurality of frame images being used for generating rendering data of the generated plurality of frame images.

13. An animation generating method comprising:

inputting a path for linking a plurality of object images selected in advance;

calculating synthesis ratios of the object images corresponding to each dividing point obtained by equally dividing the path, based on a position of the dividing point; and synthesizing the object images based on the calculated synthesis ratios for each dividing point to generate a plurality of frame images being used for generating rendering data of the generated plurality of frame images.

14. A method according to claim 13, wherein the number of divided points of the input path is determined based on a predetermined time corresponding to one path.

15. A method according to claim 13, wherein the number of divided points of the path is determined based on a speed of drawing the path.

16. A method according to claim 13, further comprising transmitting and receiving the path through a communication network.

17. A method according to claim 12, wherein the path links a plurality of other object images with each other and synthesizes the plurality of other object images based on the length and direction of the path to generate the plurality of frame images being used for generating rendering data of the generated plurality of frame images.

18. A method according to claim 13, wherein the path links a plurality of other object images with each other and synthesizes the plurality of other object images based on the length and direction of the path to generate the plurality of frame images being used for generating rendering data of the generated plurality of frame images.

19. A method according to claim 12, wherein when the input path associates predetermined synthesis-inhibiting areas of the plurality of object images, the object images are synthesized excluding the path at a portion contained in said synthesis-inhibiting areas to generate the plurality of frame images.

20. A method according to claim 13, wherein when the input path associates predetermined synthesis-inhibiting areas of the plurality of object images, the object images are synthesized excluding the path at a portion contained in said synthesis-inhibiting areas to generate the plurality of frame images.

21. A method according to claim 12, wherein the path and corresponding objects have global unique identifiers.

22. A method according to claim 13, wherein the path and corresponding objects have global unique identifiers.

23. An article of manufacture comprising:

a computer usable medium having computer readable program code means embodied therein for causing a plurality of frame images to be produced, the computer readable program code means in said article of manufacture comprising:

computer readable program code means for causing a computer to input a path for linking a preliminarily selected plurality of object images, the input path having a plurality of dividing points;

computer readable program code means for causing a computer to obtain synthesis ratios representing a correlation between the object images and the plurality of dividing paints; and computer readable program code means for causing a computer to synthesize the object images linked by the input path based on the synthesis ratios to thereby produce a plurality of frame images being used for generating rendering data of the generated plurality of frame images.

24. An article of manufacture comprising:

a computer usable medium having computer readable program code means embodied therein for causing a plurality of frame images to be produced, the computer readable program code means in said article of manufacture comprising:

computer readable program code means for causing a computer to input a path for linking a preliminarily selected plurality of object images;

computer readable program code means for causing the computer to calculate synthesis ratios of the object images corresponding to each divided point obtained by equidistantly dividing the input path, based on a position of the each divided point; and computer readable program code means for causing the computer to synthesize the object images based on each one of the synthesis ratios of each one of the object images at the each divided point to generate a plurality of frame images being used for generating rendering data of the generated plurality of frame images.

* * * * *